United States Patent
Bucceri

(10) Patent No.: US 8,151,577 B2
(45) Date of Patent: Apr. 10, 2012

(54) FROZEN BEVERAGE DEVICE

(75) Inventor: Alfio Bucceri, Hamilton (AU)

(73) Assignee: Hydro-Turbine Developments Pty Ltd, Queensland (AU)

( * ) Notice: Subject to any disclaimer, the term of this patent is extended or adjusted under 35 U.S.C. 154(b) by 39 days.

(21) Appl. No.: 12/735,212

(22) PCT Filed: Dec. 22, 2008

(86) PCT No.: PCT/AU2008/001923
§ 371 (c)(1),
(2), (4) Date: Sep. 27, 2010

(87) PCT Pub. No.: WO2009/079721
PCT Pub. Date: Jul. 2, 2009

(65) Prior Publication Data
US 2011/0020515 A1     Jan. 27, 2011

(30) Foreign Application Priority Data

Dec. 24, 2007  (AU) ............... 2007907090
Sep. 19, 2008  (AU) ............... 2008904877

(51) Int. Cl.
*F25C 1/18*  (2006.01)
(52) U.S. Cl. .......... 62/68; 62/1; 62/457.2; 62/529; 62/530; 62/66; 426/524; 426/109; 426/519; 426/393; 426/515; 206/219; 366/130
(58) Field of Classification Search .......... 62/1, 457.2, 62/529–530, 66, 68; 426/524, 109, 519, 426/393, 515; 206/219; 366/130
See application file for complete search history.

(56) References Cited

U.S. PATENT DOCUMENTS

| | | | |
|---|---|---|---|
| 74,847 A | 2/1868 | Redfield et al. | |
| 490,902 A | 1/1893 | Galbreath | |
| 740,847 A | 10/1903 | Glebsattel | |
| 1,923,522 A | 8/1933 | Whitehouse | |
| 1,944,726 A | 1/1934 | Aiken | |
| 2,021,368 A | 11/1935 | Louis et al. | |
| 3,059,452 A | 10/1962 | Griffin | |
| 3,194,468 A * | 7/1965 | Baron | 229/400 |
| 3,820,692 A * | 6/1974 | Swett et al. | 222/547 |
| 3,840,153 A | 10/1974 | Devlin | |
| 4,091,632 A | 5/1978 | Marchewka et al. | |
| 4,325,230 A | 4/1982 | Driscoll et al. | |
| 4,554,189 A | 11/1985 | Marshall | |
| 4,735,063 A | 4/1988 | Brown | |

(Continued)

FOREIGN PATENT DOCUMENTS

WO   WO 2006/063401 A1   6/2006

*Primary Examiner* — Cheryl J Tyler
*Assistant Examiner* — Orlando E Aviles Bosques
(74) *Attorney, Agent, or Firm* — Hudak, Shunk & Farine Co. LPA

(57) ABSTRACT

A frozen beverage device (10) has a container (20) and sealable cover (30) to convert a liquid (60), such as a non-alcoholic or alcoholic beverage into an at least semi-frozen slurry containing ice crystals (61). Freezing device(s) (50), which may have a range of shapes, contain refrigerant to from a thin layer of ice/ice crystals on the deformable wall(s) of the freezing device(s) (50), the ice crystals (61) being released therefrom due to agitation of the liquid (60) by shaking/rotation and/or squeezing on the container (20) and/or cover (30).

29 Claims, 4 Drawing Sheets

U.S. PATENT DOCUMENTS

| | | |
|---|---|---|
| 5,235,823 A | 8/1993 | Coker |
| 5,472,274 A | 12/1995 | Baillie |
| 5,593,127 A * | 1/1997 | Lindberg .................. 248/345.1 |
| 5,609,039 A | 3/1997 | Green et al. |
| 5,799,501 A | 9/1998 | Leonard et al. |
| 6,263,723 B1 * | 7/2001 | Takao et al. .................. 73/31.05 |
| 6,935,134 B2 | 8/2005 | Lahti et al. |
| 2007/0056313 A1 | 3/2007 | Kasza et al. |
| 2008/0123464 A1 * | 5/2008 | Griffin ......................... 366/130 |

* cited by examiner

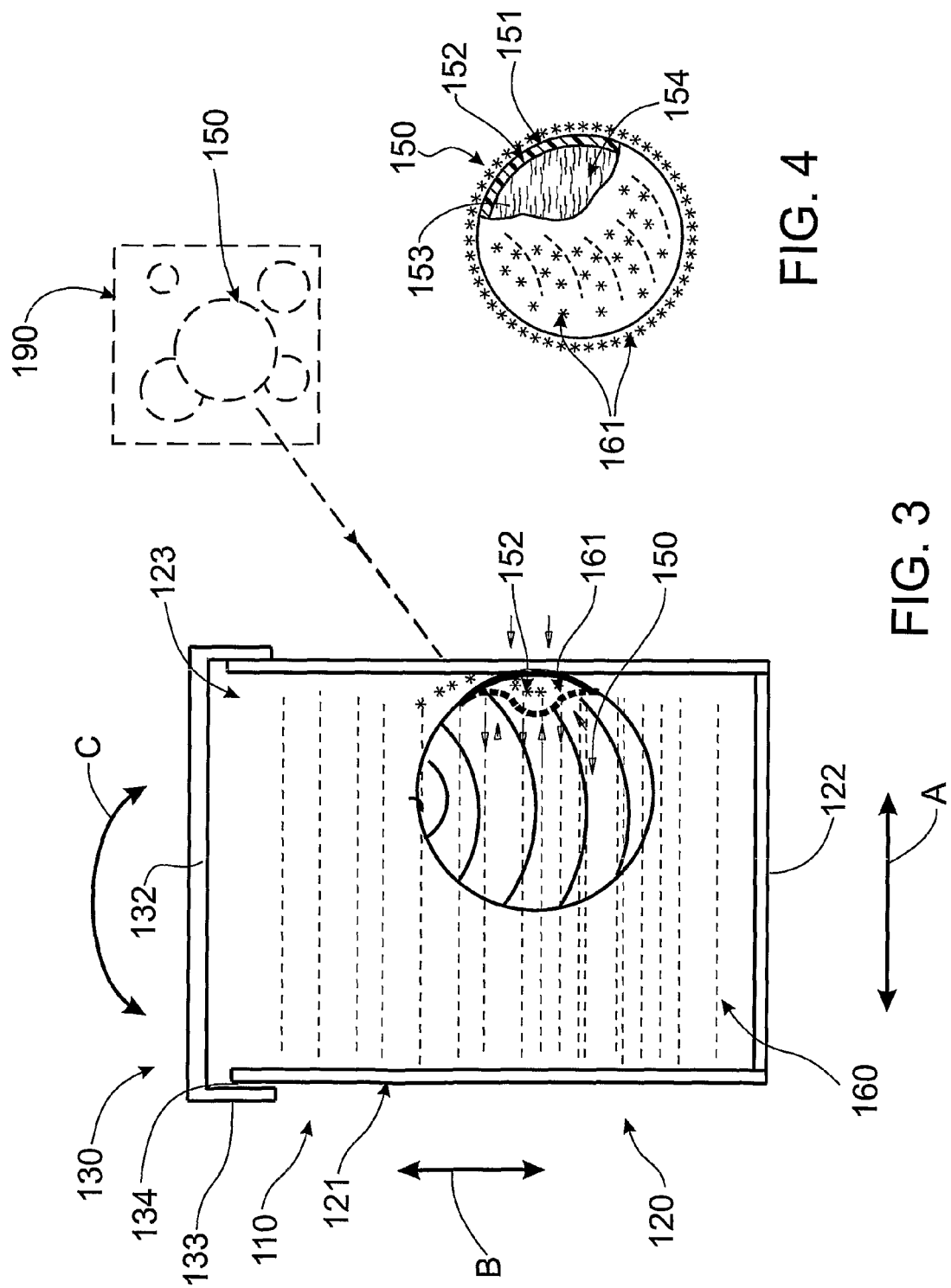

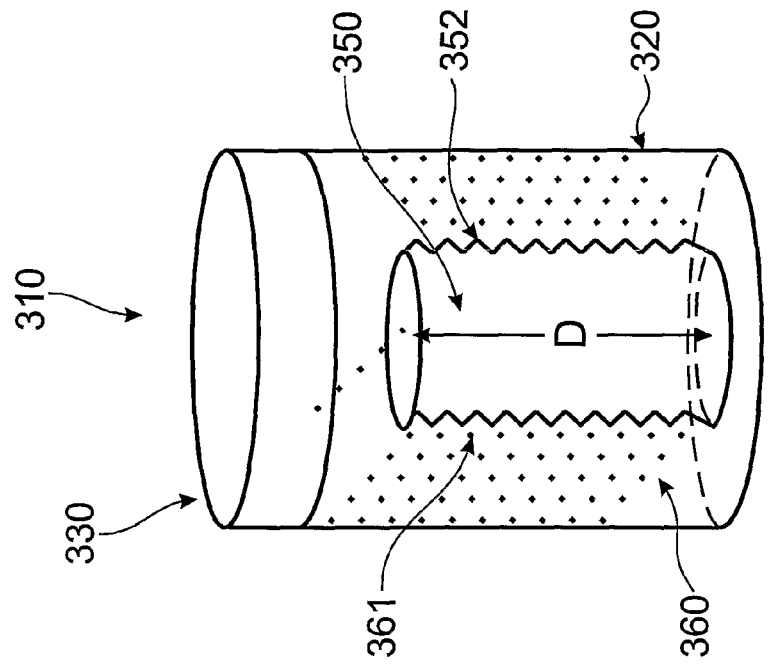
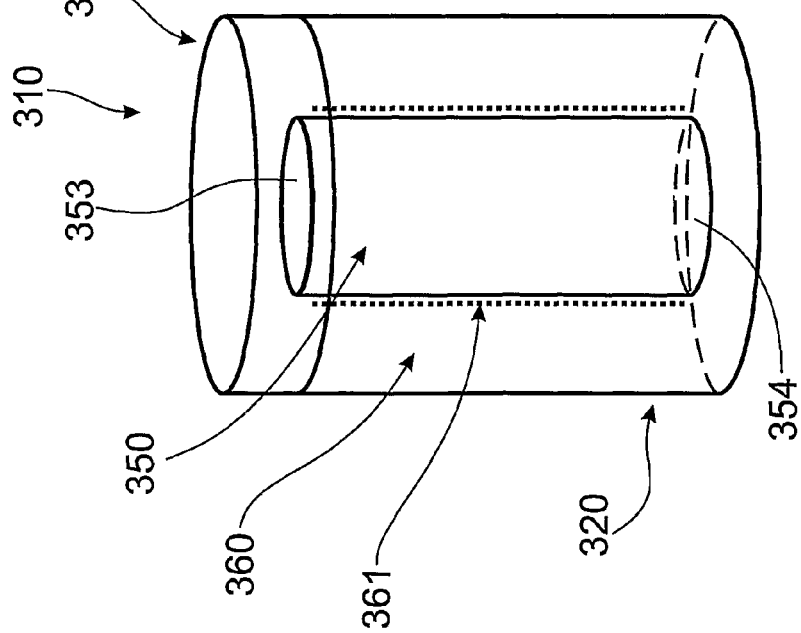
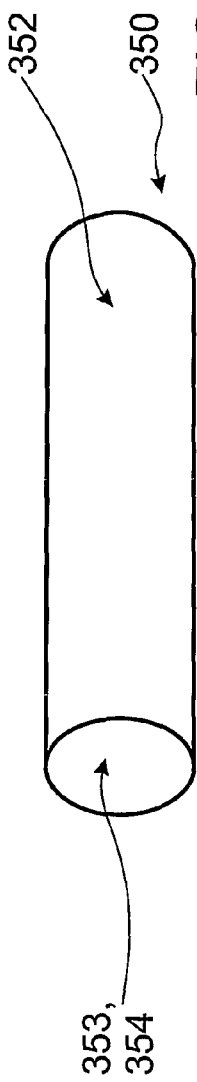
FIG. 6
FIG. 7
FIG. 8

FROZEN BEVERAGE DEVICE

BACKGROUND OF THE INVENTION

1. Field of the Invention

THIS INVENTION relates to a frozen beverage device; and to methods of producing frozen beverages using the device.

The invention is particularly suitable for, but not limited to, apparatus for making frozen beverages in semi-frozen "slurry" or "slushie" form; and to such a frozen beverage device which may be used as a toy or plaything.

Throughout the specification, the term "slurry" shall be used to include a mixture of liquid/semi-liquid, liquid/frozen and/or semi-liquid/frozen portions of the liquid.

2. Prior Art

Machines to produce so-called "slurry"-type drinks, eg., of well-known beverages such as "Coca-Cola", "Pepsi Cola" and "Schweppes Lemonade" (all registered trade marks) are well-known and commonly found in take-away food outlets and convenience stores. However, these machines are expensive to manufacture and install; and are not suitable for, eg., domestic use; or for the manufacture of a wide range of "slurry"-style beverages, including alcoholic beverages such as cocktails.

International Patent Application PCT/AU2005/001895 (=International Publication WO 2006/063401) (Bucceri, Alfio) discloses an apparatus for converting a liquid in a container to a semi-frozen slurry or to frozen ice particles, where a refrigerant is contained within a refrigerant cavity defined by at least two walls of the container, where flexing/deformation of at least one of the walls agitates the liquid to assist the conversion thereof into the semi-frozen slurry or the frozen ice particles.

While the apparatus disclosed in PCT/AU2005/001895 is effective in converting the liquid in the container into a semi-frozen slurry or the frozen ice particles, the cost of manufacture results in a product which is too expensive for the intended market; and particularly is too expensive for manufacture and sale as a disposable or "throw-away" item.

SUMMARY OF THE PRESENT INVENTION

It is an object of the present invention to provide a simplified apparatus for quickly cooling beverages (or other liquids) and/or making semi-frozen "slurry" beverages, ice creams, frozen confections, ice or the like.

It is a preferred object of the present invention to provide such an apparatus which is inexpensive to manufacture and which can be disposable.

It is a further preferred object of the present invention to provide such an apparatus which can be manufactured from food-grade materials, be hygienically cleaned and be re-used many times.

It is a still further preferred object of the present invention to provide an apparatus which only incorporates materials which are safe for use by children, and which can be safely and environmentally disposed of.

Other preferred objects of the present invention will become apparent from the following description.

In one aspect, the present invention resides in an apparatus for converting a liquid into a semi-frozen or frozen "slurry" form, including:

a container, having a mouth, operable to receive the liquid;
a cover operable to sealably close the mouth of the container; and
at least one freezing device, having a closed body at least partially filled with a refrigerant material; so arranged that:
the refrigerant material is cooled below a freezing temperature of the liquid; and when the freezing device is placed in the liquid, at least a portion of the liquid surrounding the freezing device will form an at least partially frozen layer on the exterior of the freezing device, and will be displaced therefrom when the freezing device impacts one or more walls of the container and/or the cover or lid.

Preferably, the container and the cover are formed from food-grade metal-, plastics- or polymer-material(s), which may incorporate reinforcing fibres, if to be re-usable.

The container and the cover may be insulated and/or be at least partially transparent or semi-translucent to enable the cooling process to be observed.

The cover may incorporated a closable opening, operable to allow the liquid to be introduced to the container; for the at least semi-frozen slurry to be discharged from the container; and/or allow the liquid and or the slurry to be consumed by a drinking straw or the like. In this form, the container and the cover may be formed integrally, and the closure for the closeable opening may be formed integrally with, or be attached to, the cover.

Preferably, where the apparatus is to be re-used, the container and cover are formed of metals, eg., stainless steel or aluminum; or of tough plastics- or polymer-materials, eg., polyethylene, polypropylene, PVC, ABS or the like, which may be reinforced with Nylon-, polypropylene- or carbon-fibres. Where, however, the apparatus is to be a disposable (ie., "throw-away") article, the container and cover can be injection- or blow-moulded of thin plastics- or polymer-material, eg., of the type used to produce beverage containers; or formed from waxed paper or cardboard or the like.

Preferably, the container and/or the cover are provided with sealing means to seal the junction between the mouth of the container and the container and cover may be releasably connected by screw-threadable, bayonet-coupling, frictional, or other releasable-engagement method.

A strainer member, preferably of the same material as the container and/or the cover, may be removably provided at the mouth of the container, to allow the at least semi-frozen slurry to flow into the cover, when the container is inverted, whilst retaining the freezing device(s) within the container, and before the cover is released from the container to enable consumption of the at least semi-frozen slurry.

The or each freezing device preferably has a closed body with at least one thin wall, the or each thin wall preferably formed of a material which is resiliently deformable (eg. can concertina) when impacted and/or which has at least good heat-transfer characteristics. Suitable materials for the manufacture of the freezing device(s) includes plastics, such as low density polyethylene, silicone, thermal polyurethane (TPU), PVC, Nylon, rubber, latex, vinyl; waxed paper, TPR; or flexible metals, eg., thin stainless steel, aluminum sheet or foils. The plastics may be reinforced with Nylon-, polypropylene- or carbon-fibres.

Preferably, the freezing device(s) can have an almost unlimited range of shapes, including spheres, cubes, pyramids, cylinders, or irregular shapes including novelty shapes, eg., of cartoon- or animation-characters.

Preferably, the closed bodies have internal capacities ranging from 10 milliliters (10 ml) to 50 liters (50 L) or more; and the number of the freezing device(s) to be placed in the container, to at least semi-freeze the liquid in the container, is preferably selected so that the total internal capacity of the freezing device(s) is preferably in the range of 50 to 200%, more preferably 75 to 100%, of the volume of the liquid.

Preferably, the maximum dimension(s) of the freezing device(s) is less than the minimum dimension(s) of the container and/or the cover.

Preferably, the or each freezing device is filled in the range of 70-90% of its' internal capacity with the refrigerant material; and suitable refrigerant materials include salt/water, salt/propylene glycol/water, propylene glycol/water, sugar/water mixtures, soft drinks or the like. Other refrigerant mixtures, which are safe if accidentally consumed, may be used. By way of example, the refrigerant materials may include 20% salt/80% water; 10% salt/3% propylene glycol/87% water; or 30% propylene glycol/70% water mixtures, all the percentages being on the basis of % (w/w). The refrigerant material(s) must be capable of being cooled to a temperature, eg., preferably −18° C. or lower, which is below the freezing temperature of the liquid in the container and cover.

In a second aspect, the present invention resides in a method of forming an at least semi-frozen slurry from a liquid, using the apparatus as hereinbefore described, the method including the steps of:

cooling the refrigerant material(s) in the or each freezing device, in a cooling or freezing apparatus, to a temperature below the freezing temperature of the liquid;

placing the liquid in the container and/or cover;

placing the or each freezing device in the container or cover, closing the mouth of the container with the cover; and agitating the liquid in the container and/or cover to cause the or each freezing device to move through the liquid, and for a layer of the liquid to at least semi-freeze on the or each freezing device and to be displaced therefrom when the or each freezing device impacts one or more walls of the container or cover.

Preferably the liquid is agitated by shaking the container in horizontal and/or vertical directions and/or by rotation of the container about its axes; where the shaking and/or rotation is effected eg. for 30-120 seconds for a domestic apparatus; or by squeezing the deformable wall(s) of the container.

In a third aspect, the present invention resides in an at least semi-frozen slurry or frozen beverage produced by the method hereinbefore described.

BRIEF DESCRIPTION OF THE DRAWINGS

To enable the invention to be fully understood, preferred embodiments will now be described with reference to the accompanying drawings in which:

FIG. 3 is a schematic side view of a second embodiment of the present invention, showing the deformation of the freezing device to allow the release of the frozen particles therefrom;

FIG. 4 is a schematic side view of the freezing device of FIG. 3 in part-section;

FIGS. 6 and 7 are schematic side views of a fourth embodiment of the present invention; and FIG. 8 is a perspective view of the cylindrical freezing device of FIGS. 6 and 7.

DETAILED DESCRIPTION OF THE PREFERRED EMBODIMENTS

Figure 2:
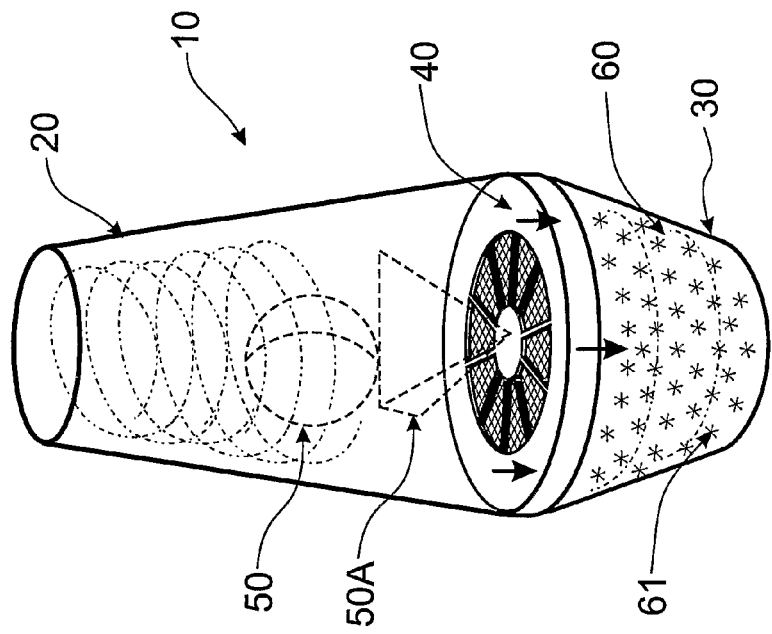
FIGS. 1 and 2 are respective schematic perspective views of a first embodiment of the apparatus, of the present invention, where the freezing devices are being placed in the liquid to be frozen, and where the liquid has been at least semi-frozen, respectively.
Figure 1:
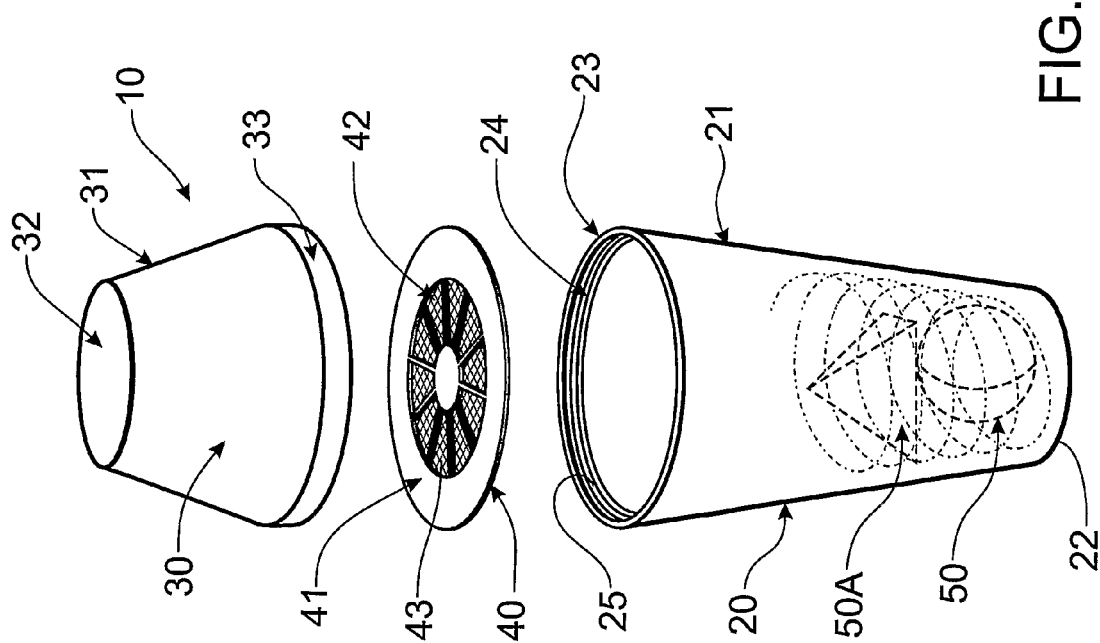

Referring to the first embodiment of the invention illustrated in FIGS. 1 and 2, the apparatus 10 incorporates a cup 20, a cover 30 and an optional strainer 40.

In this embodiment, the container 20, the cover 30 and the strainer 40 are injection-moulded from transparent or translucent plastics-material, eg., polyethylene.

The container 20 is in the form of a cup with a frusto-conical side wall 21 terminated by a bottom wall 22 at one end and by an open mouth 23 at the other end. One or more screw threads 24 (or optional bayonet-coupling components) are provided on the inner face of the side wall 21, adjacent the mouth 23, to releasably receive complementary screw-threads (or bayonet-coupling components) on the cover 30 to enable releasable engagement between the container 20 and the cover 30. A sealing surface or ring 25 may be provided within the open mouth 23 (and preferably above the screw-threads 24) to ensure sealed engagement between the container 20 and the cover 30.

The cover 30 is also of substantially frusto-conical configuration with a side wall 31 terminated at one end by a top wall 32 and at the other end by a screw-threaded rim 33, operable to engage the screw-threads 24 of the container 20.

A strainer 40 has a peripheral rim 41 releasably located in, and clamped to, the open mouth 23 of the container 20, by the cover 30. The strainer 40 has a mesh or perforated central straining panel 42 within the peripheral rim 41, where the holes or perforations 43 in the straining panel 42 are dimensioned to allow the at least semi-frozen slurry to pass therethrough when the apparatus 10 is inverted—see FIG. 2—but will restrain the freezing devices 50, 50A within the container 20.

In this embodiment, the freezing devices 50, 50A, to be hereinafter described in more detail, have the configuration of a sphere and of a pyramid, respectively. As will hereinafter be described with reference to FIG. 5, the freezing devices may have a wide range of alternative shapes, including irregular or novelty shapes, eg., of cartoon- or animation-characters.

Referring to the second embodiment of the invention illustrated in FIGS. 3 and 4, the apparatus 110 has a container 120, manufactured from thin stainless steel sheet, with a cylindrical side wall 121 terminated at one end by a bottom wall 122 and at the other end by an open mouth 123.

The cover 130 is formed from transparent or translucent plastics material, eg., as hereinbefore described with a peripheral rim 133, provided with an internal sealing ring 134, arranged for sealing/frictional engagement with the portion of the side wall 121 of the container 120 adjacent the open mouth 123.

The freezing device 150 has a closed body 151 of spherical shape, formed of a thin plastic-material (eg., polyurethane), with a resiliently deformable wall 152: and where the internal capacity 153 is 75-90% filled with the refrigerant material 154 comprising, eg., a 20% salt/80% water (w/w) mixture.

The refrigerant material 154 may be cooled to a temperature at or below −18° C. in a refrigerated freezer 190, before being transferred to the container 120.

Alternatively, the freezer 190 may contain cryogenic material, such as dry ice (carbon dioxide); or a pre-cooled brine solution at/below −10 degrees Celsius; or a similar freezing material for snap-freezing of the freezing devices 150 for quick turn around of use, eg. in a bar or stadium, where conventional refrigeration would not be acceptable. Typically, in these applications, the container 120 and cover 130 would be disposable. The liquid beverage 160 would be dispensed into the container 120, the freezing device 150 added, & the cover 130 fitted. The container 120 would be shaken to form the slurry. The freezing device 150 can be removed (and be washed/refrozen for reuse); or, if disposable, disposed with the container 120 and cover 130, after the beverage slurry is consumed.

NB: The skilled addressee will appreciate that, at any one time, a number of the freezing devices 150 will be placed in the freezer 190 so as to be ready for use.

As illustrated in FIGS. 3 and 4, the liquid 160 in the apparatus 110 will form at least a thin layer of ice or ice crystals 161 on the exterior of the body 151 of the freezing device 150, and the thin layer of ice/ice crystals 161 will be dislodged from the body 151 when the side wall 152 impacts, and is deformed by, any of the walls 121, 122 of the container 120; wall 132 and/or peripheral flange or rim 133 of the cover 130; and/or the strainer (which has been omitted for clarity).

The deformation of the wall 152 of the body 151 of the freezing device 150 is indicated by dashed lines in FIG. 3.

Arrows A, B, C indicate examples of the shaking and/or rotating motions which may be applied to the apparatus 110 to agitate the liquid 160 within the apparatus 110 and thereby cause the freezing device 150 to move through the liquid 160, and impact the walls to progressively convert the liquid to at least a semi-frozen slurry.

Figure 5:
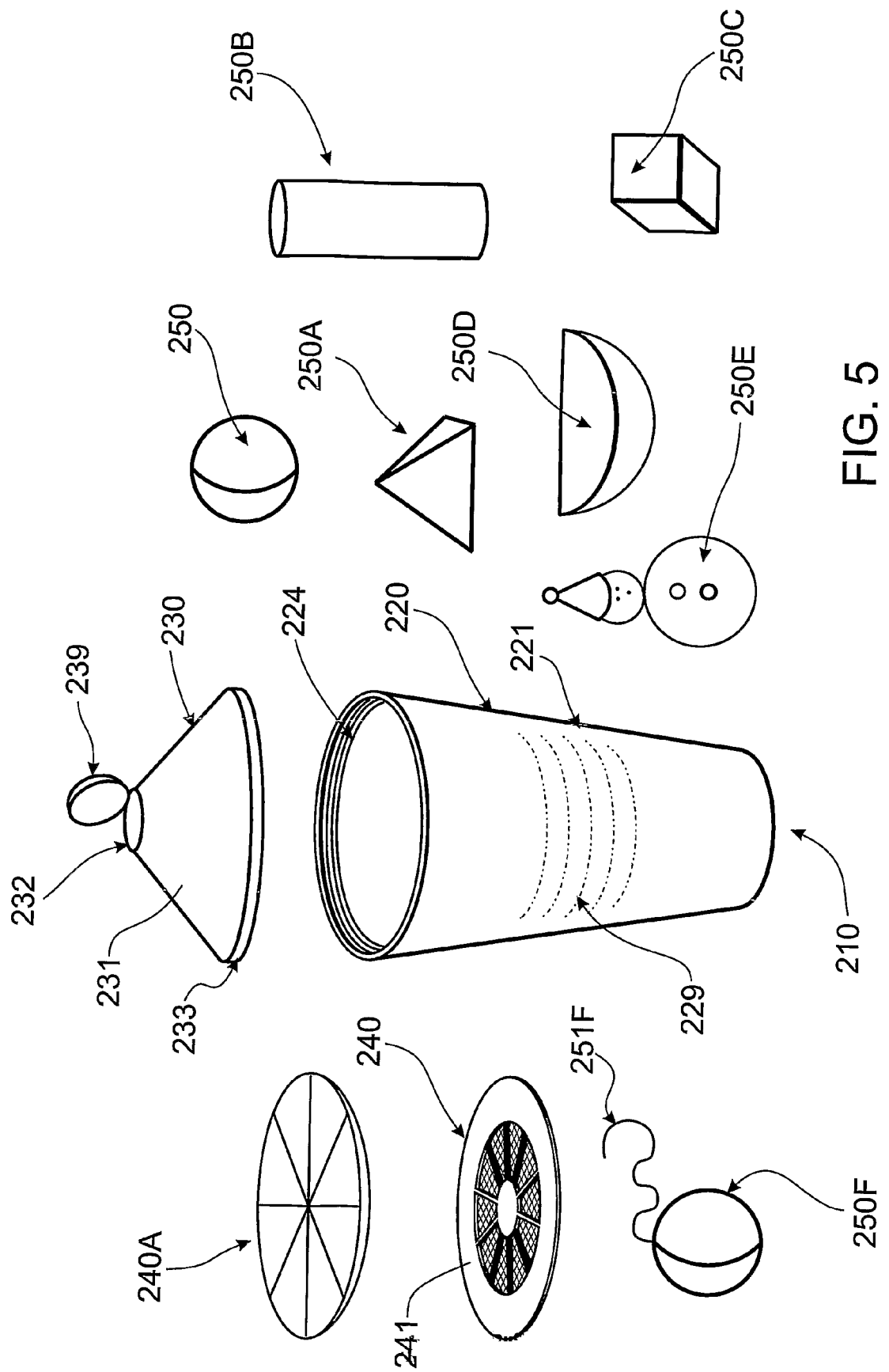
FIG. 5 is a schematic view of a third embodiment of the present invention showing some of the possible alternative shapes for the freezing devices.

Referring now to FIG. 5, the apparatus 210 of a third embodiment has a container 220 and cover 230 of generally similar configuration to the container 20 and cover 30 of the apparatus 10 of the first embodiment.

It will be noted that the side wall 221 of the container 220 has screw-threads 224 of the type hereinbefore described; and has either decorative or printed material applied to the external face 229 of the side wall 221; or the side wall 221 may incorporate integral formations which assist in the agitation of the liquid and/or dislodgement of the frozen ice/ice particles from the freezer device to be hereinafter described.

In this embodiment, the cover 230 has a frusto-conical side wall 231 as hereinbefore described, defined at one end by the peripheral rim 233.

However, at the other end, the top wall is replaced by an opening 232 which is selectively closable by an integrally formed hinged closure 239. The closure 239 enables the opening 232 to be selectively opened to enable liquid to be placed in the container 220; or the at least semi-frozen slurry to be discharged from the container 220 when the container is inverted; or to enable the insertion of a drinking straw for the consumption of the at least semi-frozen slurry within the container 220.

The strainer 240 has a configuration similar to the strainer 40 of the first embodiment; but an alternative strainer 240A omits the peripheral rim 241.

As illustrated in FIG. 5, the freezer devices can have a wide range of shapes, including a sphere 250, pyramid 250A, cylinder 250B, cube 250C, segment 250D, snowman 250E or other cartoon- or animated-character shape, or an assembly 250F incorporating a spherical shape as per the sphere 250 with a "tail" 251F which may pass through the opening 232 to enable the consumer to "jiggles" the freezing device 250F to assist in agitating the liquid in the container 220. The tail 251F may also pass through the strainer 240A to enable the latter to be pulled upwardly from the bottom of the container to scrape free any ice I ice crystals on the inner face of the side wall 221 of the container 220.

The embodiments of FIGS. 1 and 2; 3 and 4; and 5 have referred to relatively rigid containers 20, 120, 220. The agitation of the liquid can also be affected by the containers having flexible wall(s) 21, 121, 221, eg. formed of silicone, polyurethane or other flexible plastics-material, so that the walls 21, 121, 221 can be squeezed (eg. as in the direction of arrow D in FIG. 7) against the freezing devices 50, 150, 250 to form the slurries. This can avoid need to shake the containers 20, 120, 220, thereby minimizing accidental release of the covers 30, 130, 230 as the slurries are formed.

Referring now to the fourth embodiment illustrated in FIGS. 6 to 8, the apparatus 310 has a container 320 and cover 330 substantially as hereinbefore described.

The freezing device 350 is of cylindrical shape, and the cylindrical side wall 352 can "concertina", as shown in FIG. 7, to displace the ice crystals 361 formed (from the liquid 360) thereon, when the container 320 is shaken in the direction of arrow D, to cause the end walls 353, 354 of the freezing device 350 to impact the container 320 and cover 330.

In a modified form of this embodiment, the container 320 may be provided in the shape of a soft drink container, and the freezing device 350 could also be made in the same shape to make a frozen beverage from a known soft drink supplier.

As hereinbefore described, the freezer devices may have a range of internal capacities, from 10 milliliters (10 ml) to 50 liters (50 L) or larger, depending on the intended volume of liquid to be at least semi-frozen to a slurry or completely frozen to ice particles.

As illustrated in FIGS. 1 and 2, one or more freezer devices, of similar, different shape(s) can be used simultaneously to convert the liquids to the slurries and/or ice particles.

The selection of the number (and thereby total internal capacity) of the freezer device(s) and/or the refrigerant material(s) will be dependent on the volumes and/or freezing temperatures of the liquids. For example, a higher refrigerant material/liquid ratio is required to at least semi-freeze alcoholic beverages than water-based beverages, as the alcohol tends to act as an "anti-freeze" and so slow the conversion of the liquids to the ice/ice particles. For example, the total internal capacity of the freezer device(s) to be used with alcohol-based beverages may be on a 100%:100% ratio (v/v) with the volume of the beverages; whereas the ratio for water-based beverages may only be 75%:100% (v/v).

Furthermore, the number of freezer devices required will be dependent on the initial temperature of the liquids; and it is preferred that the liquids at least be reduced in temperature to, eg., 4° C., within the refrigerator before the freezer devices are added.

Preferably, the maximum dimension of any of the freezer devices will not be equal to, or larger than, the minimum dimensions of the container and/or cover; and preferably, the volume of the container is at least three times the total volume of the freezer devices.

The shaking and/or rotation of the apparatus 10, 110, 210 may be manually, eg., for a domestic apparatus; or by machine in a semi-domestic or "commercial" application, eg., in a bar or cocktail lounge.

The apparatus may be manufactured so that it is disposable after a single use; or may be designed to be hygienically cleaned and re-used many times.

As not all the refrigerant material may become liquid as it absorbs the heat from the surrounding liquid, the time the freezer devices require in the freezer 190 for re-use can be reduced.

It will be readily apparent to the skilled addressee that the present invention provides a simple, inexpensive, yet efficient apparatus, and method, for converting liquids, such as alcoholic and non-alcoholic beverages, into at least semi-frozen slurries or frozen confections.

In addition, the freezing devices can enable existing containers, eg. cocktail shakers or drink containers to produce at least semi-frozen slurry beverages.

Various changes and modifications may be made to the embodiments described and illustrated without departing from the present invention.

The invention claimed is:

1. An apparatus for converting a liquid into a semi-frozen or frozen "slurry" form, including:
   a container, having a mouth, operable to receive the liquid;
   a cover operable to sealably close the mouth of the container; and
   at least one freezing device, the at least one freezing device having a closed body, with at least one wall, the at least one wall being formed of a resiliently deformable material, the closed body being at least partially filled with a refrigerant material;
   wherein in a first operational mode the refrigerant material inside the at least one freezing device is cooled below a freezing temperature of the liquid; and in a second operational mode, after the first operational mode, with the at least one freezing device with the refrigerant material cooled below a freezing temperature of the liquid placed in the container, the liquid is added to the container before and/or after the at least one freezing device is placed in the container, wherein at least a portion of the liquid in contact with the at least one wall of the at least one freezing device in the second operational mode forms an at least partially frozen layer on an exterior of the at least one freezing device, and in a third operational mode, after said first and second operational modes, the container and/or cover is agitated and the at least one wall of the at least one freezing device impacts at least one wall of the container and/or cover and the at least one freezing device is deformed in the at least one wall and the at least partially frozen layer will be displaced from the exterior of the at least one freezing device to convert said liquid into said semi-frozen or frozen "slurry" form.

2. The apparatus as claimed in claim 1, wherein:
   the container and the cover are formed from one or more of a food-grade metal-,
   a plastic material and a polymer material, which optionally incorporate reinforcing fibers; and
   wherein the container and the cover are optionally insulated and/or are at least partially transparent or semi-translucent to enable the cooling process to be observed.

3. The apparatus as claimed in claim 1, wherein:
   the cover incorporates a closeable opening, operable to allow the liquid to be introduced to the container; or the at least semi-frozen slurry to be discharged from the container; and/or allow the liquid and/or the slurry to be consumed by a drinking straw.

4. The apparatus as claimed in claim 3, wherein:
   the container and the cover are formed integrally; and a closure for the closable opening is formed integrally with, or attached to, the cover.

5. The apparatus as claimed in claim 1, wherein:
   where the apparatus is to be re-used, the container and cover are formed of metals, and/or of tough plastic- or polymer-materials, which are optionally fiber-reinforced; but where the apparatus is to be a disposable article, the container and cover are injection- or blow-molded of plastic- or polymer-material, or formed of waxed paper or cardboard.

6. The apparatus as claimed in claim 1, wherein:
   the container and/or the cover are provided with a sealing surface or ring to seal a junction between the mouth of the container and the cover; and
   the container and cover are releasably connected by screw-threadable, bayonet-coupling, frictional, or other releasable-engagement members.

7. The apparatus as claimed in claim 1, wherein:
   a strainer member, optionally of the same material as the container and/or the cover, is removably provided at the mouth of the container, to allow the at least semi-frozen slurry to flow into the cover, when the container is inverted, whilst retaining the at least one freezing device within the container, after the cover is released from the container to enable consumption of the at least semi-frozen slurry.

8. The apparatus as claimed in claim 1, wherein:
   the closed body of the or each freezing device has heat-transfer characteristics; and suitable materials for the manufacture of the at least one freezing device includes plastics or flexible metals.

9. The apparatus as claimed in claim 1, wherein:
   the closed body of the at least one freezing device is of cylindrical shape with a cylindrical side wall that operates in the manner of a concertina.

10. The apparatus as claimed in claim 1, wherein:
    the closed body has an internal capacity ranging from 10 milliliters (10 ml) to 50 liters (50 L); and
    the number of the at least one freezing device to be placed in the container, to at least semi-freeze the liquid in the container, is selected so that the total internal capacity of the at least one freezing device is in the range of 50 to 200%, of the volume of the liquid.

11. The apparatus as claimed in claim 10, wherein:
    the maximum dimensions of each of the at least one freezing device are less than the minimum dimensions of the container and/or the cover.

12. The apparatus as claimed in claim 10, wherein:
    the closed body of the at least one freezing device is filled in the range of 70-90% of its' internal capacity with the refrigerant material; and
    the refrigerant materials include at least one of salt/water, salt/propylene glycol/water, propylene glycol/water, sugar/water mixtures and soft drinks.

13. The apparatus as claimed in claim 12, wherein:
    the refrigerant materials includes 20% salt/80% water; 10% salt/3% propylene glycol/87% water; or 30% propylene glycol/70% water mixtures, all the percentages being on the basis of % (w/w); and
    the refrigerant material is capable of being cooled to a temperature, optionally −18° C. or lower, which is below the freezing temperature of the liquid in the container and cover.

14. The apparatus as claimed in claim 8, wherein said plastic comprises polyurethane, PVC, rubber, latex, or vinyl, and wherein said metal comprises stainless steel, aluminum sheet or foil.

15. A method of forming an at least semi-frozen slurry from a liquid, using an apparatus including a container having a mouth to receive the liquid, a cover to operatively close the mouth of the container, and at least one freezing device, the at least one freezing device having a closed body, at least partially filled with a refrigerant material and having at least one wall, the at least one wall being formed of a material which is resiliently deformable when impacted, the method including the steps of:

cooling the refrigerant material in the at least one freezing device, in a cooling or freezing apparatus, to a temperature below a freezing temperature of the liquid;

placing the liquid in the container and/or cover;

placing the at least one freezing device in the container and/or cover, closing the mouth of the container with the cover; and agitating the liquid in the container and/or cover to cause the at least one freezing device to move through the liquid, and for a layer of the liquid to at least semi-freeze on the at least one freezing device and then to be displaced therefrom when the at least one freezing device impacts at least one wall of the container or cover.

16. The method as claimed in claim 15, wherein:

the liquid is agitated by shaking the container in horizontal and/or vertical directions and/or by rotation of the container about its axes; or by squeezing the at least one wall of the container and/or cover, the at least one wall of the container and/or cover being resiliently deformable, in to contact with the at least one freezing device; and where the shaking and/or rotation and/or squeezing is effected optionally for 30-120seconds for a domestic apparatus.

17. The method as claimed in claim 15, wherein:

the container and the cover are formed from one or more of a food-grade metal, a plastic material and a polymer-material, which optionally incorporate reinforcing fibers;

the container and the cover are optionally insulated and/or at least partially transparent or semi-translucent to enable the cooling process to be observed; and optionally, the cover incorporates a closable opening, operable to allow the liquid to be introduced to the container; or the at least semi-frozen slurry to be discharged from the container; and/or allow the liquid and or the slurry to be consumed by a drinking straw.

18. The method as claimed in claim 17, wherein:

the container and the cover are formed integrally; and a closure for the closeable opening is formed integrally with, or attached to, the cover.

19. The method as claimed in claim 15, wherein:

a sealing surface or ring is provided to seal a junction between the mouth of the container and the cover; and the container and cover are releasably connectable by screw-threadable, bayonet-coupling, frictional, or other releasable-engagement members.

20. The method as claimed in claim 15, wherein: a strainer member, optionally of the same material as the container and/or the cover, is removably provided at the mouth of the container, to allow the at least semi-frozen slurry to flow into the cover, when the container is inverted, whilst retaining the at least one freezing device within the container after the cover is released from the container, to enable consumption of the at least semi-frozen slurry.

21. The method as claimed in claim 15, wherein: the container has at least one side wall of resiliently deformable material, so arranged that squeezing of the at least one wall into contact with the at least one freezing device will release ice crystals therefrom.

22. The method as claimed in claim 21, wherein:

the at least one freezing device is of substantially cylindrical shape, with a cylindrical side wall interconnecting a pair of end walls, so arranged that the cylindrical side wall operates in the manner of a concertina to release the ice crystals therefrom when the end walls impact the container and/or the cover.

23. The method as claimed in claim 21, wherein:

the closed body is selected to have an internal capacity ranging from 10 milliliters (10 ml) to 50 liters (50 L); and the number of the at least one freezing device placed in the container, to at least semi-freeze the liquid in the container, is selected so that the total internal capacity of the at least one freezing device is in the range of 50 to 200%, of the volume of the liquid.

24. The method as claimed in claim 23, wherein: the maximum dimensions of the at least one freezing device are selected to be less than the minimum dimensions of the container and/or the cover.

25. The method as claimed in claim 23, wherein:

the closed body of the at least one freezing device is filled in the range of 70-90% of its' internal capacity with the refrigerant material; and the at least one refrigerant material is selected from one or more of salt/water, salt/propylene glycol/water, propylene glycol/water, sugar/water mixtures and soft drinks.

26. The method as claimed in claim 25, wherein:

the at least one refrigerant material includes 20% salt/80% water; 10% salt/3% propylene glycol/87% water; or 30% propylene glycol/70% water mixtures, all the percentages being on the basis of % (w/w); and the at least one refrigerant material is capable of being cooled to a temperature, optionally −18° C. or lower, which is below the freezing temperature of the liquid in the container and cover.

27. The method as claimed in claim 21, wherein the resiliently deformable material is silicone or polyurethane.

28. A method of forming an at least semi-frozen slurry from a liquid, the method including the steps of:

cooling at least one refrigerant material at least partially filling a closed body of at least one freezing device, in a cooling or freezing apparatus, to a temperature below a freezing temperature of the liquid, the closed body having at least one wall formed of a material which is resiliently deformable when impacted:

placing the liquid in a container and/or cover;

placing the at least one freezing device in the container and/or cover;

closing a mouth of the container with the cover; and agitating the liquid in the container and/or cover to cause the at least one freezing device to move through the liquid; and for a layer of the liquid to at least semi-freeze on the at least one freezing device and then to be displaced therefrom, by deformation of the at least one wall, when the at least one freezing device impacts at least one wall of the container and/or cover.

29. The method as claimed in claim 28, wherein:

the liquid is agitated by shaking the container in horizontal and/or vertical directions and/or rotation of the container about its axes; or by squeezing the at least one wall of the container and or cover, the at least one wall of the container and/or cover being resiliently deformable, in to contact with the at least one freezing device;

and where the shaking and/or rotation and/or squeezing is effected optionally for 30-120 seconds for a domestic apparatus.

* * * * *